Patented July 28, 1953

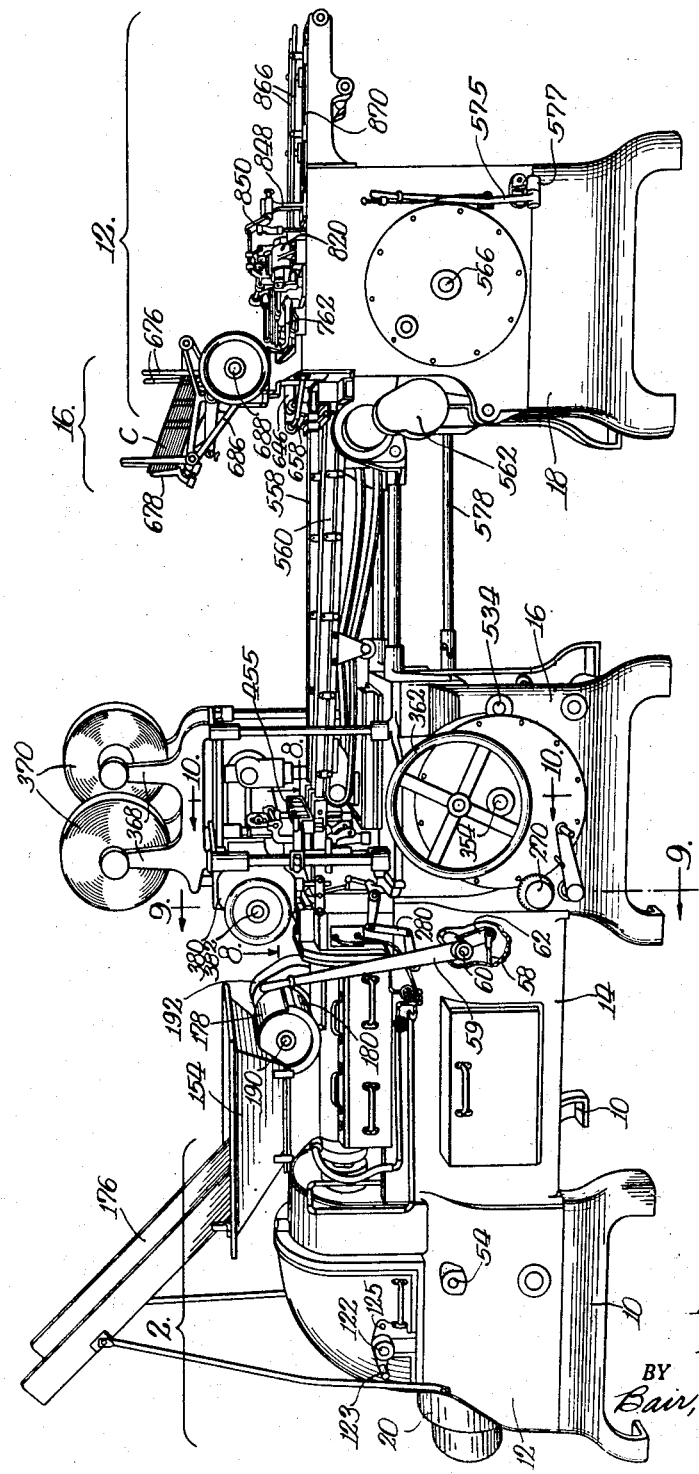

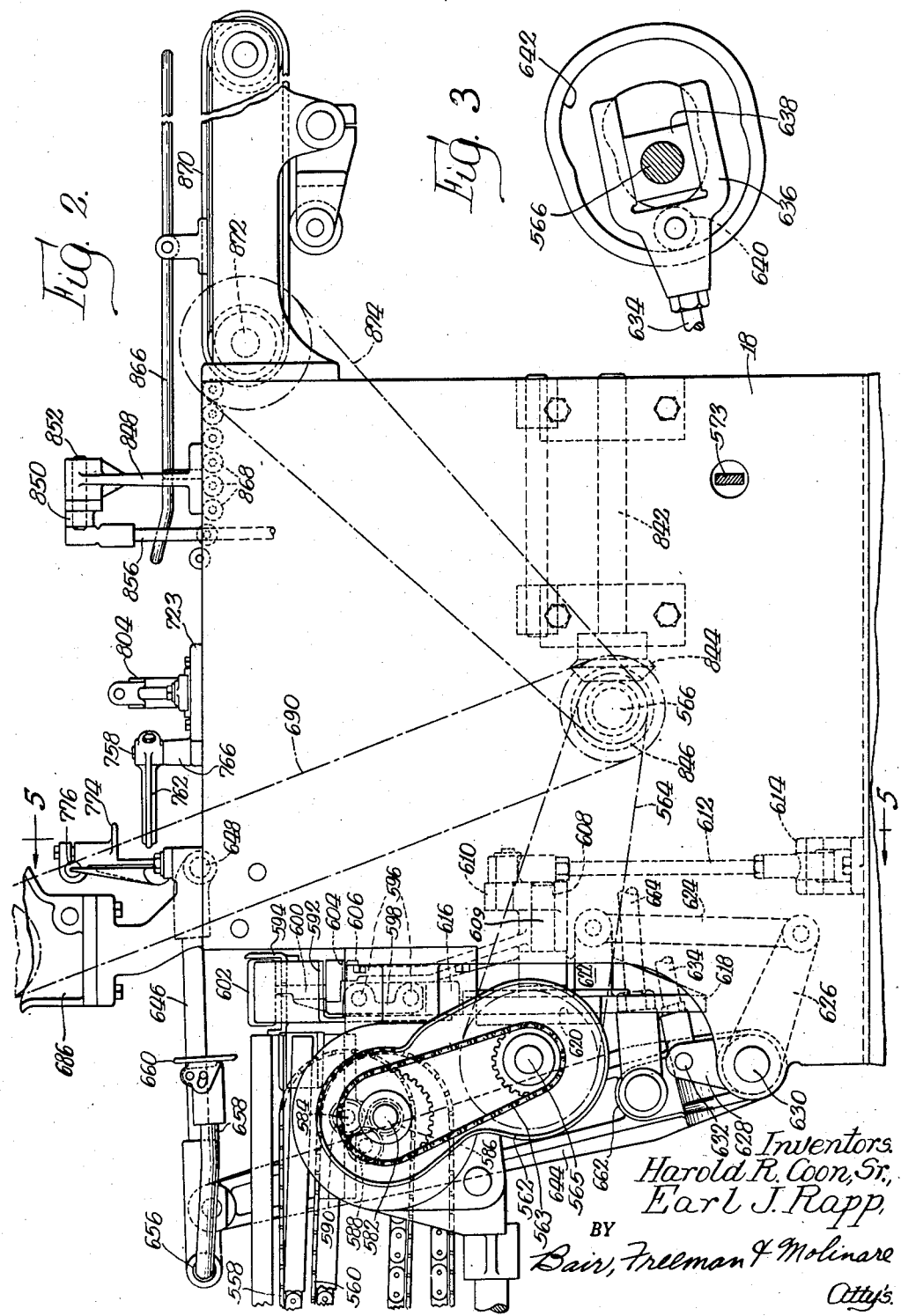

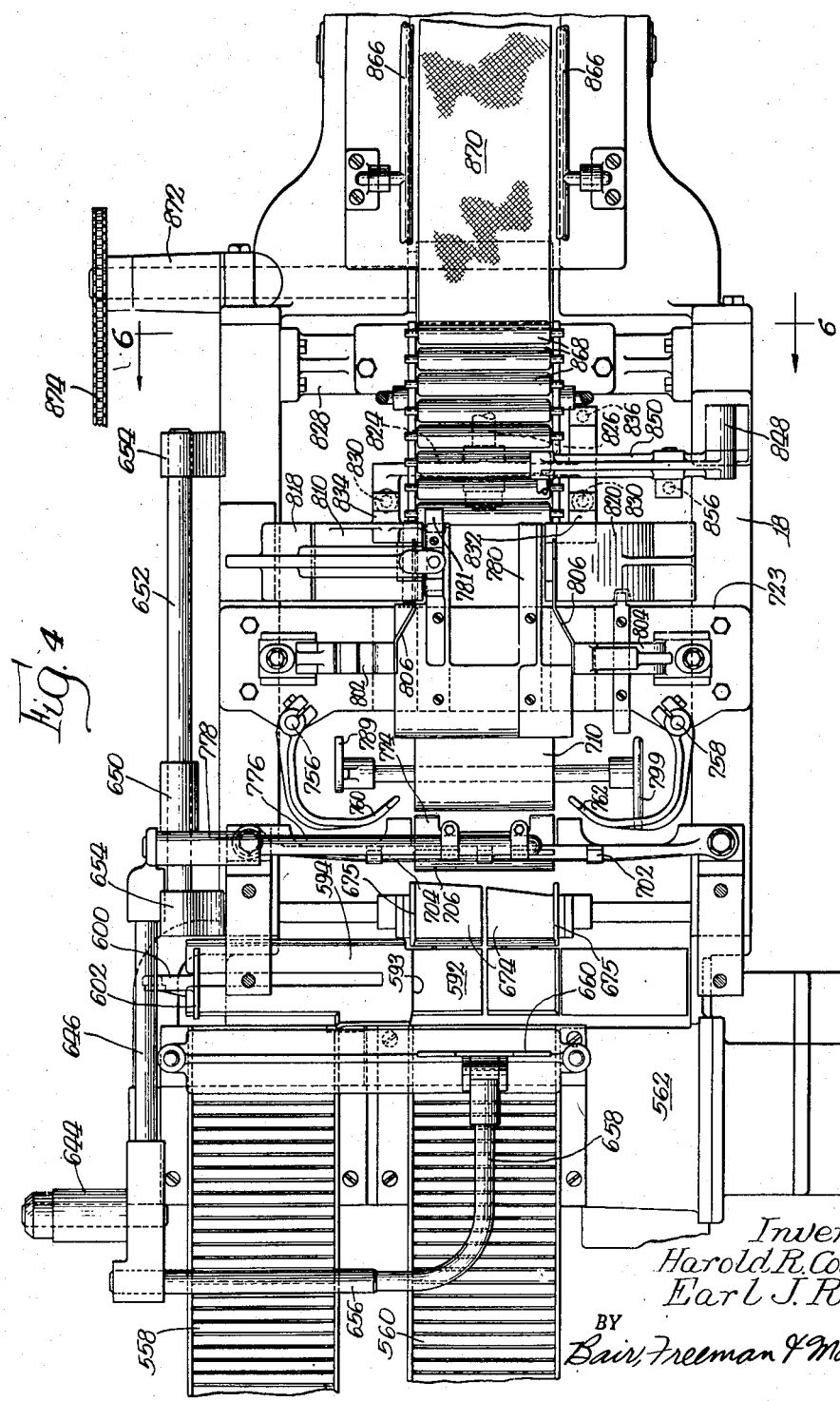

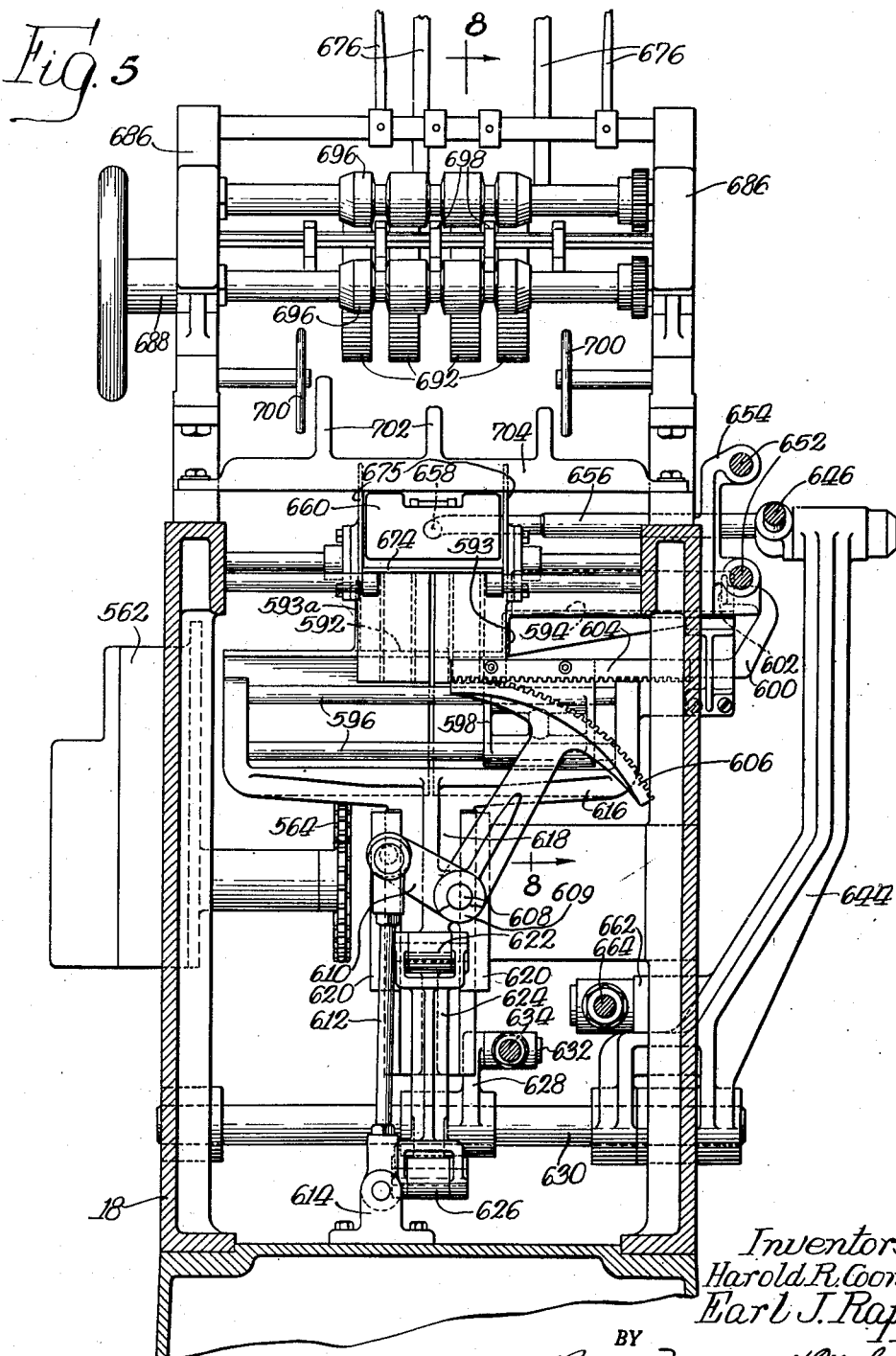

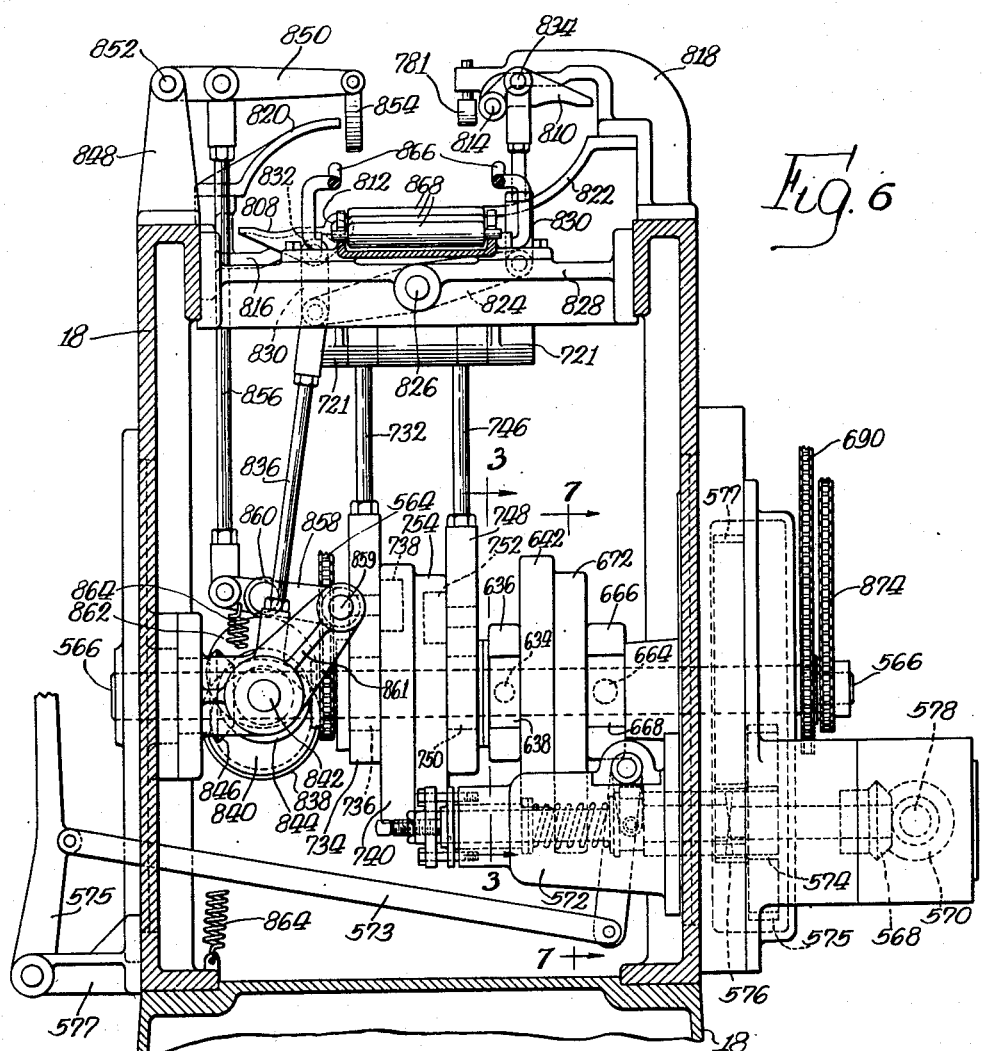
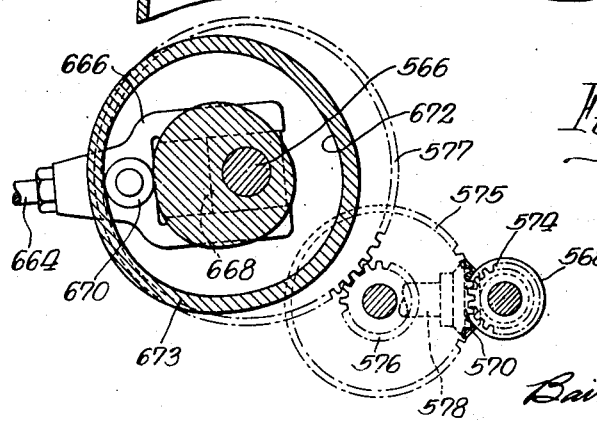

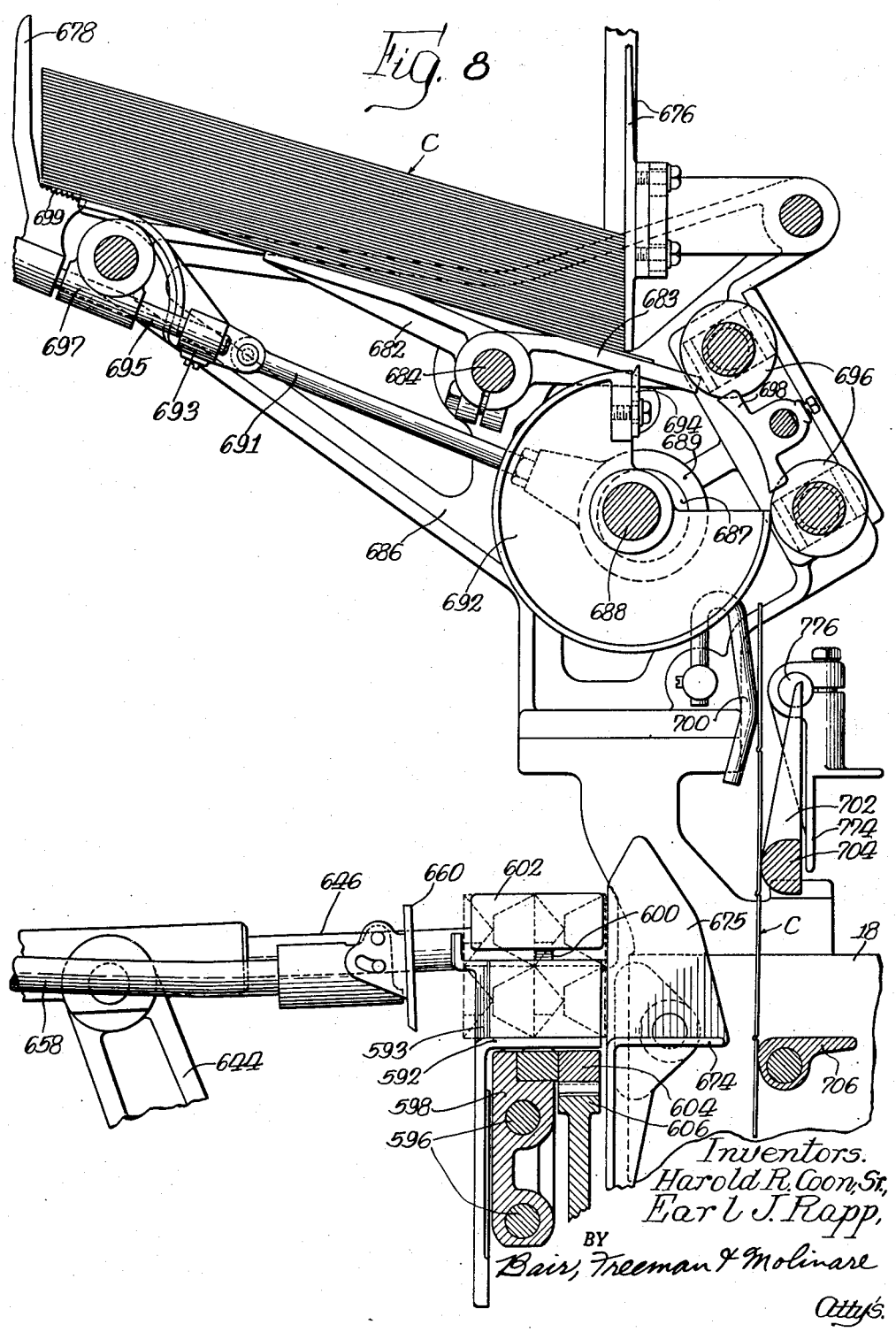

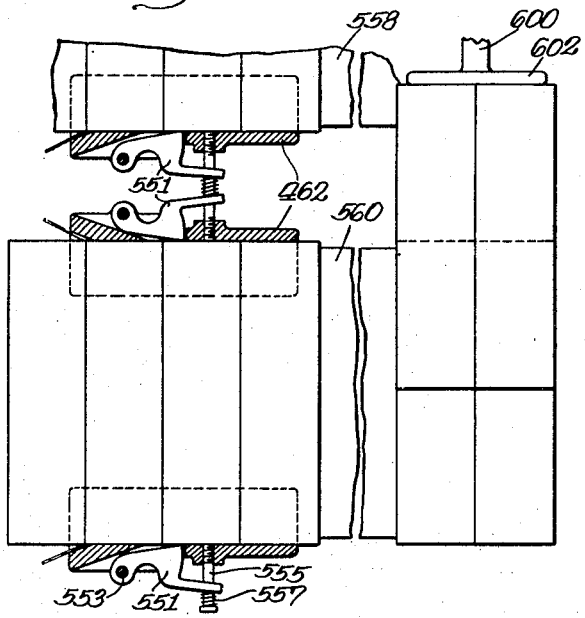
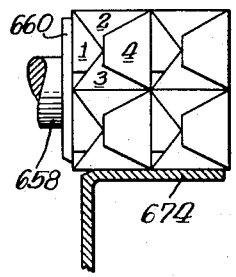

2,646,898

UNITED STATES PATENT OFFICE 2,646,898

STACKING AND ELEVATING DEVICE

Harold R. Coon, Sr., and Earl J. Rapp, Toledo, Ohio, assignors to Lynch Corporation, Anderson, Ind., a corporation of Indiana Original application May 14, 1945, Serial No. 593,708. Divided and this application September 21, 1951, Serial No. 247,928

5 Claims. (Cl. 214—6)

This invention relates to an automatic stacking and elevating device adapted to receive wrapped prints of butter or the like for stacking and subsequent delivery, for instance, to a cartoning device. This application is a division of our application, Serial No. 593,708, filed May 14, 1945, now Patent No. 2,592,793, entitled Printing, Wrapping and Cartoning Machine for Butter and the like.

An important object is to provide the stacking mechanism in the form of a pair of conveyors delivering the printed and wrapped articles along two separate paths, one of which terminates at a higher elevation than the other, means being provided to then push a plurality of the wrapped prints at the upper elevation onto a similar plurality of prints at the lower elevation, thus producing a stack which can be cartoned within a single carton.

Still another object is to provide an operating mechanism for stacking the prints in this manner and which includes a vertically reciprocable support having two supporting surfaces at different elevations and a ram for moving two prints on the upper surface onto two prints on the lower surface, thus producing a stack of four prints which are then moved against the carton and the carton folded around the four prints and closed, the closed carton then being delivered from the machine.

With these and other objects in view, our invention consists in the construction, arrangement and combination of the various parts of our device whereby the objects contemplated are attained, as hereinafter more fully set forth, pointed out in the claims and illustrated in the accompanying drawings, wherein:

Fig. 1 is a perspective view of a printing, wrapping and cartoning machine for butter and the like embodying our invention and showing the general relation to the parts of the machine, this view being of the side of the machine considered as the right-hand side when facing the direction of travel of the butter therethrough;

Fig. 2 is a side elevation of the portion of Fig. 1 indicated by the bracket 12 and showing by dot-and-dash lines the drive from a cam shaft to various other elements of the machine;

Fig. 3 is a vertical view taken along the line 3—3 of Fig. 7 showing said cam shaft in section and a cam and associated mechanism for operating a certain link shown in Fig. 2;

Fig. 4 is a plan view of the portion of the machine shown in Fig. 2;

Fig. 5 is a vertical sectional view on the line 5—5 of Fig. 2 and showing a lateral transfer mechanism for the butter print;

Fig. 6 is a vertical sectional view on the line 6—6 of Fig. 4 showing a cartoning cam shaft and details of the various mechanisms driven thereby;

Fig. 7 is a vertical sectional view on the line 7—7 of Fig. 6;

Fig. 8 is an enlarged vertical sectional view on the line 8—8 of Fig. 5;

Fig. 9 is a plan view of portions of the intake conveyors which receive the wrapped prints and convey them, for instance to a cartoning mechanism, two prints from one conveyor being shown at the right-hand side of the figure in a position pushed about half way onto two prints from the other conveyor; and Fig. 10 is a vertical sectional view showing four wrapped prints in stacked formation;

Figures 1 to 10 of this application are identical, respectively, with Figures 1, 12, 12a, 13, 14, 15, 15a, 16, 24 and 25 of our said copending application. For facilitating cross reference, the same numerals are used in this application as in said copending application. Reference is made to said copending application for complete description of parts not described in this application.

The device shown in the drawings of this application is adapted to receive wrapped prints of butter. Such prints are received by conveyors shown at 558 and 560 (see Figs. 2 and 4). The driving mechanism for the conveyors 558 and 560 is shown in Fig. 2 and consists of a chain 563 and sprockets within a housing 562 and a chain 564. The chain 564 connects a shaft 565 driven by the chain 563 with a driving shaft 566.

The gearing within the housing 562 drives a shaft 582 around which the conveyor belt 560 extends (see Fig. 2). The conveyor belt 558 extends around a shaft 584 which is somewhat higher than the shaft 582. The shaft 584 is geared to the shaft 582 by intermediate gears 586, 588 and 590.

Prints of butter are adapted to be received from the conveyor 560 directly by a print support 592. The prints from the conveyor 558 are adapted to be received directly by a print support 594. The print supports 592 and 594 are horizontal and are part of a single bracket which has a vertical transition wall 593 (see Fig. 5). The print support 592 is lower than the print support 594, and each one is wide enough to support two prints of butter. With such an arrangement two prints are adapted to be supported on the element 592, and the two prints supported on the element 594 are then adapted to be slid to a position where they are supported by the two prints on the element 592. The element 592 has a vertical stop flange 593a.

The mechanism for accomplishing this function comprises a pair of guide rods 596 on which is slidable a bracket 598. The bracket 598 has secured thereto a bracket 600 terminating in a print pusher pad 602. The pad 602 is adapted for pushing the two prints from the support 594 onto the two prints on the support 592, as will hereinafter appear.

For reciprocating the print pusher 602 we provide a rack 604 secured to the bracket 600 and meshing with a gear sector 606. The gear sector 606 is secured to a rock shaft 608. Extending from the rock shaft 608 is an arm 610 pivoted to the upper end of a link 612. The link 612 is pivoted to a stationary bracket 614.

The print supports 592 and 594 are secured to a yoke 616 and this yoke supports the guide rods 596 at their ends. The yoke terminates in a vertical slide 618 guided in stationary vertical slideways 620. The slide 618 has a bearing 609 journaling the rock shaft 608 and a boss 622 to which is pivoted the upper end of an arm 624 having yoked ends, the lower end of which is pivoted to an arm 626. The arm 626 is a bell crank arm, the other arm of which is indicated at 628 (see Fig. 2), and this arm is oscillatable on a rock shaft 630. The bell crank 626—628 may therefore rock independently of the shaft 630.

The upper end of the arm 628 carries a pivot pin 632 to which one end of a link 634 is pivoted. The other end of this link has a fork 636 thereon slidable in relation to a guide block 638 on the cam shaft 566, as shown in Fig. 3. The fork 636 carries a roller 640 which coacts with a groove in a cam 642 mounted on the cam shaft 566.

The rock shaft 630 has an upwardly extending arm 644 which has pivoted to its upper end a link 646. The link 646 has its forward end pivoted at 648 to a slide 650. The slide 650 is slidable on a pair of guide rods 652 (see Figs. 4 and 5) which are supported in stationary brackets 654. The rear end of the link 646 has a rod 656 extending therefrom over the conveyors 558 and 560. The rod has a forwardly extending part 658. The rod part 658 terminates in a ram plate 660 adapted to push four prints of butter from the support 592 when it is elevated a predetermined degree above the position shown in Fig. 2.

The arm 644, as shown in Fig. 5, has a boss 662 with which one end of a link 664 is pivotally connected. The link 664, as shown in Figs. 6 and 7, terminates in a fork 666 slidable on a guide block 668 through which the cam shaft 566 rotatably extends. The fork 666 carries a roller 670 adapted to coact with the groove 672 of a cam 673. The cam 673 is also mounted on the cam shaft 566 for rotation therewith.

When the print support 592 is in the elevated position of Fig. 8, four prints of butter thereon are adapted to be pushed by the ram plate 660 onto a support 674 between a pair of side plates 675 extending upwardly therefrom. The four prints of butter are then adapted to be cartoned in a carton, the blank for such carton being shown at C.

The functional relationship of the above described parts is as follows. The vertical slide 618 carries the yoke 616 and the print supports 592 and 594 are reciprocated vertically in the slideway 620 by force transmitted from the shaft 566 through the cam 642 on the shaft 566, the link 634 with its rollers 640, the pivotal connection between the link 634 and the bell crank 626—628, the pivotal connection between the bell crank 626—628 and the arms 624, and the pivotal connection between the arm 624 and the boss 622 on the slide 618.

When the slide 618 is thus elevated, the journal 609 on the slide 618 for the rock shaft 608 is raised. Since the left end of the arm 610 extending from the shaft 608 is kept from being elevated by its pivotal connection with the upper end of the link 612 (which has its lower end pivoted to the stationary bracket 614), the shaft 608 is then caused to rock counter-clockwise, with the result that the gear sector 606 will swing to the left, carrying with it the rack 604 forming part of the bracket 598—600, carrying the pusher pad 602 and slidable on the guide rods 596 on the yoke 616. When the slide 618 is lowered, the direction of movement of the pusher pad 602 is reversed, i. e., the pad is retracted to the rod.

The link 646 with its rod 656—658 extending therefrom and terminating in ram plate 660 is reciprocated horizontally by force transmitted from the cam shaft 566 through the cam 673 on the cam shaft, the link 664 having at one end the roller 670 coacting with a cam 673, the pivotal connection between the other end of the link 664 and the boss 662 on the arm 644, and the pivotal connection between the upper end of the link 644 and the link 646. Note that the boss 662 is located between the ends of the link 644 and that the lower end on the link 644 is rotatable on the shaft 630. The horizontal reciprocation of the link 646, the rod 658 and the terminal ram plate 660 of the latter is guided by the slide 650 pivoted to the link 646 and sliding on the guide rod 652.

The two cams 642 and 673 on the cam shaft 566 are so shaped that elevation of the print supports 592 and 594 precedes horizontal forward movement of the ram plate 660, and retraction of the ram plate 660 is effected before the print supports 592 and 594 are again elevated.

The various cams are so contoured and timed in relation to each other that the various parts of the machine cooperate to elevate and stack four butter prints in a manner hereinafter described in detail in connection with the operation of our machine.

The prints of butter are carried forwardly in the machine by the conveyors 558 and 560 to the vertical offset positions shown in Figs. 9 and 10. Two of the upper prints are pushed by the print pusher 602 off the supporting element 594 and onto the two prints of butter on the supporting element 592, which elements at this time are in vertical alignment with the conveyors. The print pusher has moved one-half the length of a butter print in Fig. 9. The supporting elements 592 and 594 are elevated while the pusher 602 is in motion, and the four prints of butter are then pushed by the ram plate 660 from the supporting element 592, as shown in Fig. 8, onto the support 674, as shown in Fig. 10. The stack prints may then be cartoned in a manner described in our said copending application.

Some changes may be made in the construction and arrangement of the parts of our machine without departing from the real spirit and purpose of our invention, and it is our intention to cover by our claims such modified forms of structure or use of mechanical equivalents as may be reasonably included within their scope.

We claim as our invention:

1. A device for simultaneously stacking and elevating a plurality of articles, said device comprising two conveyors extending side by side and having vertically offset terminals, supporting means having two vertically offset supporting surfaces and movable vertically between an upper position and a lower position wherein said supporting surfaces are aligned with said conveyor terminals to receive a plurality of articles therefrom, reciprocable pusher means carried by said supporting means for pushing articles from said upper supporting surface onto articles on said lower supporting surface to stack said articles, elevating means for moving said supporting means between said upper and lower positions and actuating means for said reciprocable pusher means synchronized with said elevating means to effect article pushing advancement of said pusher means as said supporting means is raised and retraction of said pusher means as said supporting means is lowered.

2. A device for concurrently advancing, stacking and elevating a plurality of articles, said device comprising two conveyors extending side by side and having vertically offset terminals, supporting means having two vertically offset supporting surfaces arranged side by side, said supporting means being movable vertically between an upper position and a lower position wherein said supporting surfaces are aligned with said conveyor terminals to receive a plurality of articles therefrom, first pusher means carried by said supporting means and reciprocable transversely across said upper supporting surface for pushing articles from said upper supporting surface onto articles on said lower supporting surface to stack said articles, second pusher means reciprocable lengthwise over said lower supporting surfaces and operative when said supporting means is in said upper position to displace a stack of said articles from said lower supporting surface, a supporting member for receiving a stack of said articles displaced from said lower supporting surface, elevating means for moving said supporting means between said upper and lower positions, actuating means for said first reciprocable pusher means synchronized with said elevating means to effect article pushing advancement of said first pusher means as said supporting means is raised and retraction of said first pusher as said supporting means is lowered, and actuating means for said second pusher means synchronized with said elevating means to effect stack pushing advancement of said second pusher means when said supporting means is in said upper position and retraction of said second pusher means as said supporting means is lowered.

3. A device for concurrently advancing, stacking and elevating a plurality of articles, said device comprising two conveyors extending side by side and having vertically offset terminals, an elevator having two vertically offset supporting surfaces arranged side by side and movable vertically between an upper position and a lower position wherein said supporting surfaces are aligned with said conveyor terminals to receive a plurality of articles therefrom, a first pusher carried by said elevator and slidable transversely across said upper supporting surface for pushing articles from said upper supporting surface onto articles on said lower supporting surface to stack said articles, a rack extending transversely of said elevator and rigidly connected to said pusher, a gear sector meshing with said rack and oscillatably mounted on said elevator, a link having one end pivoted to said gear sector and another end pivotable but otherwise fixed to effect oscillation of said gear sector with consequent reciprocation of said first pusher as said elevator is moved, second pusher means reciprocable lengthwise over said lower supporting surfaces and operative when said supporting means is in said upper position to displace a stack of said articles from said lower supporting surface, a supporting member for receiving a stack of said articles displaced from said lower supporting surface, elevating means for moving said supporting means between said upper and lower positions, actuating means for said first reciprocable pusher means synchronized with said elevating means to effect article pushing advancement of said first pusher means as said supporting means is raised and retraction of said first pusher as said supporting means is lowered, and actuating means for said second pusher means synchronized with said elevating means to effect stack pushing advancement of said second pusher means when said supporting means is in said upper position and retraction of said second pusher means as said supporting means is lowered.

4. A device for concurrently advancing, stacking and elevating a plurality of articles, said device comprising two conveyors extending side by side and having vertically offset terminals, an elevator having two vertically offset supporting surfaces arranged side by side and movable between an upper position and a lower position wherein said supporting surfaces are aligned with said conveyor terminals to receive a plurality of articles therefrom, a transverse slideway affixed to one side of said elevator, a first carriage reciprocable on said slideway, a first pusher carried by said carriage and reciprocable transversely across said upper supporting surface for pushing articles from said upper supporting surface onto articles on said lower supporting surface to stack said articles, a rack rigidly connected to said carriage, a gear sector meshing with said rack and mounted oscillatably on said elevator, a link having one end pivoted at a fixed point and another end pivoted to said sector for oscillating said sector as said elevator is moved whereby said pusher is reciprocated across said upper supporting surface as said elevator is raised, a rotatable shaft carrying first and second cams, a first link system actuated by said first cam to reciprocate said elevator, a stationary slideway extending beside said elevator lengthwise of said conveyor, a second carriage slidable on said stationary slideway, a generally U-shaped rod having one end pivotally connected to said second carriage and another end reciprocable lengthwise of said conveyors across said lower supporting surface to push therefrom articles stacked therein, and a second link system actuated by said second cam to reciprocate said end lengthwise of said conveyors, said first and second cams being shaped to effect pushing movement of said end across said lower supporting surface when said elevator has been raised to said upper position.

5. A device for concurrently stacking and elevating a plurality of articles, said device comprising an elevator having two vertically offset supporting surfaces arranged side by side and adapted to receive a plurality of said articles, a transverse slideway affixed to one side of said elevator, a carriage reciprocable on said slideway, a pusher carried by said carriage and reciprocable across said upper supporting surface for pushing articles from said upper supporting surface onto articles on said lower supporting surface to stack said articles, a rack rigidly connected to said carriage, a gear sector meshing with said rack and mounted oscillatably on said elevator, a link having one end pivoted at a fixed point and another end pivoted to said sector for oscillating said sector as said elevator is moved whereby said pusher is reciprocated across said upper supporting surface as said elevator is raised, and means for raising and lowering said elevator.

HAROLD R. COON, Sr.
EARL J. RAPP.

References Cited in the file of this patent

UNITED STATES PATENTS

| Number | Name | Date |
| --- | --- | --- |
| 2,324,925 | Hallowell, Jr. | July 20, 1943 |
| 2,552,867 | Rapp | May 15, 1951 |